(12) United States Patent
Fulcher et al.

(10) Patent No.: US 11,613,367 B2
(45) Date of Patent: Mar. 28, 2023

(54) EJECTION SEAT AND RAIL ASSEMBLIES FOR AIRCRAFT EVACUATION SYSTEMS

(71) Applicant: AMI INDUSTRIES, INC., Colorado Springs, CO (US)

(72) Inventors: Jackson Fulcher, Colorado Springs, CO (US); Steve Holstine, Peyton, CO (US); Casey A. Stribrny, Colorado Springs, CO (US); Nicholas K. Bharucha, Colorado Springs, CO (US); John Hampton, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 0 days.

(21) Appl. No.: 17/337,129

(22) Filed: Jun. 2, 2021

(65) Prior Publication Data

US 2022/0388670 A1     Dec. 8, 2022

(51) Int. Cl.
*B64D 25/10*     (2006.01)

(52) U.S. Cl.
CPC .................... *B64D 25/10* (2013.01)

(58) Field of Classification Search
CPC ............... B64D 25/10; B65G 21/22; F16H 2007/185; F16H 2007/0872
See application file for complete search history.

(56) References Cited

U.S. PATENT DOCUMENTS

| | | | |
|---|---|---|---|
| 2,494,005 A | 1/1950 | Sabbia | |
| 2,638,293 A * | 5/1953 | Lindstrom | A42B 3/0473 297/480 |
| 2,900,150 A * | 8/1959 | Hirt | B64D 25/10 244/141 |
| 2,924,406 A | 2/1960 | Hildebrand | |
| 3,116,900 A * | 1/1964 | Fulton | B64D 25/10 244/122 AD |
| 3,442,473 A * | 5/1969 | Rivedal | B64D 25/02 244/141 |
| 3,525,490 A | 8/1970 | Duncan et al. | |
| 3,549,111 A | 12/1970 | Stencel | |
| 3,621,383 A | 11/1971 | Rush et al. | |
| 3,645,480 A * | 2/1972 | Forman | B64D 25/02 244/122 AG |
| 3,647,168 A * | 3/1972 | Eggert, Jr. | B64D 25/10 244/122 A |
| 5,067,671 A * | 11/1991 | McIntyre | B64D 25/10 244/122 A |

(Continued)

FOREIGN PATENT DOCUMENTS

| CN | 206765861 | 12/2017 |
|---|---|---|
| GB | 645323 | 10/1950 |

OTHER PUBLICATIONS

UK Intellectual Property Office, United Kingdom Search Report dated Nov. 25, 2022 in Application No. GB2208185.5.

*Primary Examiner* — Richard G Davis

(74) *Attorney, Agent, or Firm* — Snell & Wilmer L.L.P.

(57) ABSTRACT

An ejection system may comprise an ejection seat and a rail assembly. A plurality of sliders may be coupled to the ejection seat. The rail assembly may include a rail defining a channel and a rail insert located in the channel. The rail insert may define an insert channel configured to receive the plurality of sliders.

17 Claims, 5 Drawing Sheets

(56) References Cited

U.S. PATENT DOCUMENTS

| | | | |
|---|---|---|---|
| 5,857,560 A * | 1/1999 | Bjorkholm | B29C 45/14565 |
| | | | 198/816 |
| 10,807,736 B2 | 10/2020 | Palaniappan et al. | |
| 2004/0104307 A1 | 6/2004 | Stokes | |

* cited by examiner

US 11,613,367 B2

EJECTION SEAT AND RAIL ASSEMBLIES FOR AIRCRAFT EVACUATION SYSTEMS

FIELD

The present disclosure relates to ejection seats and, more specifically, to ejection seat rail assemblies.

BACKGROUND

Certain aircraft may include ejection systems designed to eject a member of the flight crew from the aircraft in certain situations. These ejection systems typically include an ejection seat in which the member of the flight crew is located during flight and which can be ejected from the aircraft cockpit in case of emergency. The ejection seat typically includes rollers attached to the sides of the seat structure. The rollers are generally located in a rail (or roller track) which may be affixed to a stationary structure in the cockpit. The rollers translate along the rail to help guide the ejection seat during ejection. However, during an ejection, the acceleration of the ejection seat can cause the rollers to gall, warp, and cause binding of the rollers to the rails. This binding action can prevent the rollers from spinning and may create a safety hazard if the binding impedes the upward movement of the ejection seat. Further, the added friction can reduce the overall ejected height of the seat and pilot, which may impact terrain clearance requirements.

SUMMARY

An ejection system is disclosed herein. In accordance with various embodiments, the ejection system may comprise an ejection seat, a plurality of first sliders coupled to the ejection seat, and a rail assembly. The rail assembly may include a first rail defining a first channel and a first rail insert located in the first channel. The first rail insert may define a first insert channel. The first insert channel may be configured to receive the plurality of first sliders.

In various embodiments, a cross-sectional shape of the first insert channel complements a cross-sectional shape of a first slider of the plurality of first sliders. In various embodiments, the first rail insert may comprise a base portion, a first wall extending from the base portion, a first lip extending from the first wall, a second wall extending from the base portion, and a second lip extending from the second wall and towards the first lip.

In various embodiments, the cross-sectional shape of the first insert channel may be a dovetail. In various embodiments, a first interior surface of the first wall may be oriented at an acute angle relative to an interior surface of the base portion, with the first interior surface of the first wall and the interior surface of the base portion defining, at least, a portion of the first insert channel.

In various embodiments, an interior surface of the base portion may comprise a concave curve, the interior surface of the base portion defining, at least, a portion of the first insert channel. In various embodiments, a first interior surface of the first wall may be parallel to a second interior surface of the second wall.

In various embodiments, a friction reducing coating may be formed over an interior surface of the first rail insert, the interior surface of the first rail insert defining, at least, a portion of the first insert channel. The friction reducing coating may have a coefficient of sliding friction that is less than a coefficient of sliding friction of the interior surface of the first rail insert.

In various embodiments, a plurality of second sliders may be coupled to the ejection seat. The plurality of first sliders may be located along a first side of the ejection seat and the plurality of second sliders may be located along a second side of the ejection seat, the second side of the ejection seat being opposite the first side. A second rail assembly may be located proximate the second side of the ejection seat. The second rail assembly may include a second rail defining a second channel and a second rail insert located in the second channel. The second rail insert may define a second insert channel configured to receive the plurality of second sliders.

In various embodiments the ejection seat may be configured to rotate relative to a first slider of the plurality of first sliders. In various embodiments, a damper may be coupled between the first slider and the ejection seat.

A rail assembly for guiding an ejection seat during ejection is also disclosed herein. In accordance with various embodiments, the rail assembly may comprise a rail defining a channel and a rail insert located in the channel. The rail insert may define an insert channel.

In various embodiments, the rail insert may be made of a first material and the rail may be made of a second material. The second material may be different from the first material.

In various embodiments, the rail insert may comprise a base portion, a first wall extending from the base portion, a first lip extending from the first wall, a second wall extending from the base portion, and a second lip extending from the second wall and towards the first lip.

In various embodiments, a first interior surface of the first wall may be oriented at an acute angle relative to an interior surface of the base portion, the first interior surface of the first wall and the interior surface of the base portion defining, at least, a portion of the insert channel.

In various embodiments, an interior surface of the base portion may comprise a concave curve, the interior surface of the base portion defining, at least, a portion of the insert channel.

In various embodiments, a friction reducing coating may be formed over an interior surface of the rail insert, the interior surface of the rail insert defining, at least, a portion of the insert channel. The friction reducing coating may have a coefficient of sliding friction that is less than a coefficient of sliding friction of the interior surface of the rail insert.

An ejection system, in accordance with various embodiments, may comprise an ejection seat and a rail. The ejection seat may include at least one of a plurality of sliders or a plurality of rollers coupled to a side of the ejection seat. The rail may define a channel configured to receive the at least one of the plurality of sliders or the plurality of rollers. A first friction reducing coating may be formed over an interior surface of the rail. The interior surface of the rail defines, at least, a portion of the channel. The first friction reducing coating may have a coefficient of sliding friction that is less than a coefficient of sliding friction of the interior surface of the rail.

In various embodiments, a second friction reducing coating may be formed over the at least one of the plurality of sliders or the plurality of rollers. The second friction reducing coating may have a coefficient of sliding friction that is less than a coefficient of sliding friction of the at least one of the plurality of sliders or the plurality of rollers.

In various embodiments, the ejection seat may include the plurality of sliders and a first damper may be coupled between a first slider of the plurality of sliders and the side of the ejection seat. A second damper may be coupled between the first slider and the side of the ejection seat. A seatback of the ejection seat may be configured to rotate relative to the first slider.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
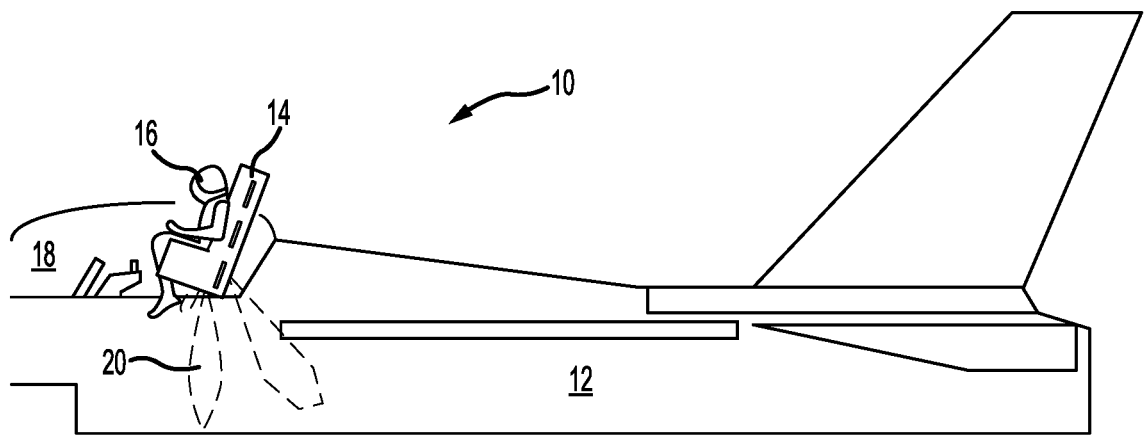
FIG. 1 illustrates an ejection seat being launched from an aircraft cockpit, in accordance with various embodiments.

With reference to FIG. 1, an aircraft ejection system 10 is shown. In accordance with various embodiments, aircraft ejection system 10 may be installed in an aircraft 12 to expel an ejection seat 14 and an occupant 16 of ejection seat 14 from a cockpit 18 of aircraft 12. Ejection seat 14 may be urged from cockpit 18 by a propulsion system 20. While aircraft 12 and aircraft ejection system 10 are illustrated having a single ejection seat 14, it is contemplated and understood that aircraft 12 may include multiple ejection seats, which may be expelled via aircraft ejection system 10 or their own respective aircraft ejection system.

Figure 2:
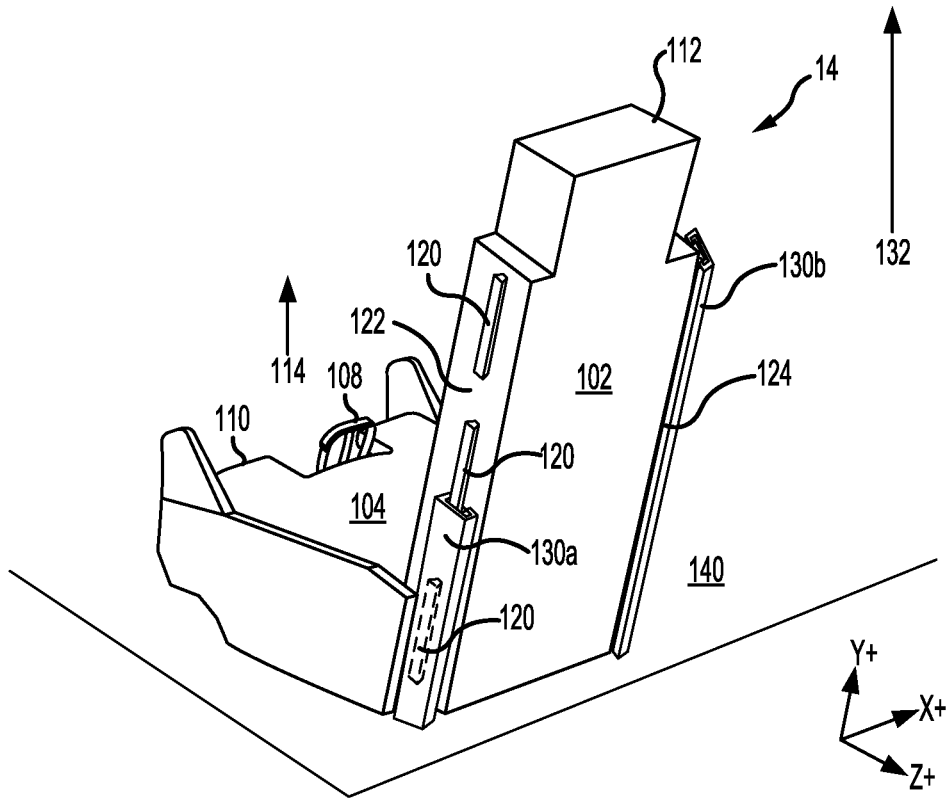
FIG. 2 illustrates an ejection seat and rail assembly, in accordance with various embodiments.

With reference to FIG. 2, and continuing reference to FIG. 1, ejection seat 14 of ejection system 10 is illustrated. Ejection seat 14 includes a seatback 102 and a seat pan 104. Seat pan 104 supports a bulk of the weight of the seat occupant 16. In various embodiments, an ejection handle 108 may be located proximate a frontside 110 of seat pan 104. Frontside 110 of seat pan 104 is generally opposite, or distal, seatback 102. While FIG. 2 shows ejection handle 108 located at frontside 110 of seat pan 104, it is further contemplated and understood that ejection handle 108 may be located anywhere that is accessible to an occupant of ejection seat 14. For example, ejection handle 108 may be located proximate a headrest 112 of ejection seat 14 or in other locations in cockpit 18. Ejection handle 108 may be configured to initiate an ejection sequence upon actuation. For example, occupant 16 (FIG. 1) pulling ejection handle 108 in the direction of arrow 114 may initiate the ejection sequence that expels ejection seat 14 from aircraft 12.

In accordance with various embodiments, ejection seat 14 includes a plurality of sliders 120. Sliders 120 are coupled to opposing sides of ejection seat 14. For example and with momentary additional reference to FIG. 3, in various embodiments, a plurality of first sliders 120a may be located along a left (or first) side 122 of seatback 102 (e.g., a length dimension of the first sliders 120a being disposed along a common axis; for example, a length dimension of a given first slider 120a being the largest dimension of this first slider 120a) and a plurality of second sliders 120b may be located along a right (or second) side 124 of seatback 102 (e.g., a length dimension of the second sliders 120b being disposed along a common axis; for example, a length dimension of a given second slider 120b being the largest dimension of this second slider 120b). A length dimension of the first sliders 120a and second sliders 120b may oriented to coincide with a spacing between a top and a bottom of the seatback 102 (e.g., to extend along a height dimension of the seatback 102).

Returning to FIG. 2, in accordance with various embodiments, a left (or first) rail assembly 130a and a right (or second) rail assembly 130b (collectively referred to as rail assemblies 130) are located proximate left side 122 and right side 124, respectively, of ejection seat 14. In FIG. 2, the upper portion of the left rail assembly 130a has been removed to illustrate sliders 120. Rail assemblies 130 are configured to receive sliders 120. In this regard, the sliders 120 located along left side 122 may be located in left rail assembly 130a and the sliders 120 located along right side 124 may be located in right rail assembly 130b. Rail assemblies 130 are stationary structures which remain in cockpit 18 during expulsion of ejection seat 14. The coupling between sliders 120 and ejection seat 14 causes sliders 120 to translate with ejection seat 14 during ejection. During ejection, sliders 120 will translate, or slide, within channels defined by their respective rail assemblies 130. Rail assemblies 130 are configured to restrict sliders 120 from moving in the forward and aft directions (i.e., along the Z-axis) and/or in the left and right direction (i.e., along the X-axis), thereby helping to guide sliders 120 and ejection seat 14 out of cockpit 18 and in the direction of arrow 132 (i.e. in the positive direction on the Y-axis). As described in further detail below, rail assemblies 130 may each include a rail insert. The rail insert may allow rails that were previously used with rollers to be retrofit for sliders 120. Sliders 120 may be formed of any suitable material that will reduce friction relative to the rail and/or to the rail insert. In various embodiments, sliders 120 may be formed of steel or other suitable low coefficient of friction material. For example, in various embodiments, the material of sliders 120 is selected such that the kinetic coefficient of friction for slider 120 on the rail insert is less than 0.75. In various embodiments, the kinetic coefficient of friction for slider 120 on the rail insert may be less than 0.50. Forming sliders 120 using steel or other low coefficient of friction material tends to reduce occurrences of binding between sliders 120 and the rail inserts.

Figure 3:
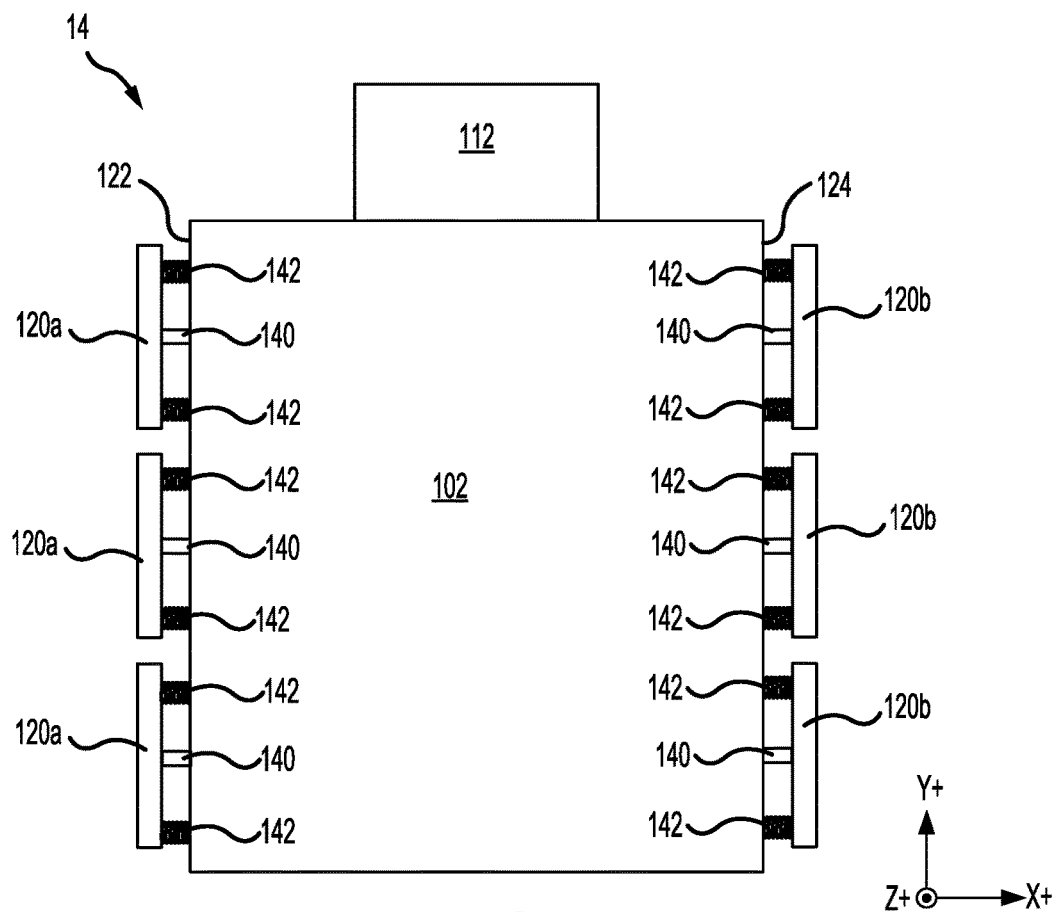
FIG. 3 illustrates an ejection seat, in accordance with various embodiments.

With reference to FIG. 3, ejection seat 14 having first sliders 120a and second sliders 120b (collectively referred to as sliders 120) is illustrated. In accordance with various embodiments, each slider 120 may be coupled to seatback 102 via a shaft, or pivot joint, 140. Shaft 140 is configured to allow seatback 102 to rotate, or pivot, relative to slider 120. In this regard, shaft 140 allows seatback 102 to rotate in the fore and aft directions (i.e., about the X axis) relative to slider 120 and rail assemblies 130, with momentary reference to FIG. 2. In various embodiments, shaft 140 may comprise a roller shaft, which has been retrofitted to sliders 120. In this regard, ejection seat 14 may be retrofitted with sliders 120 by removing the roller from shaft 140 and attaching a slider 120 to shaft 140 in place of the removed roller.

In various embodiments, one or more damper(s) 142 may be attached between each first slider 120a and left side 122 of seatback 102, and between each second slider 120b and right side 124 of seatback 102. Dampers 142 may include springs, wave washers, or any other suitable load damper. Dampers 142 are configured to dampen loads between ejection seat 14 and sliders 120. In this regard, dampers 142 may reduce vibration of ejection seat 14 during flight and ejection.

Figure 4:
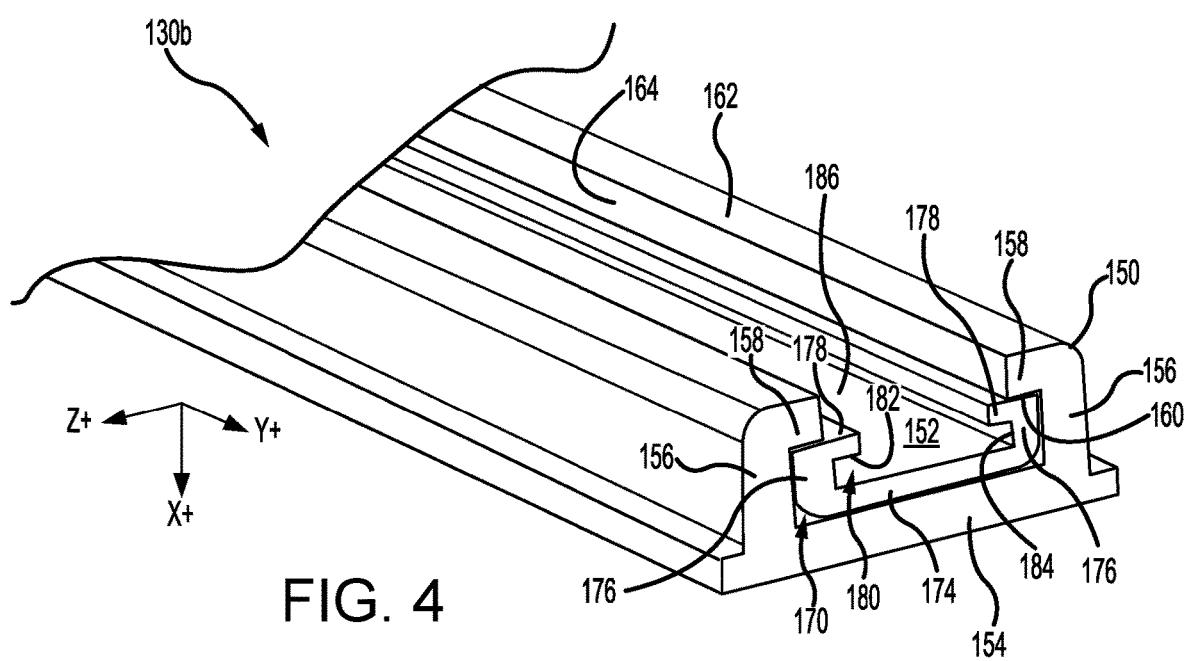
FIG. 4 illustrates a rail assembly, in accordance with various embodiments.
Figure 5:
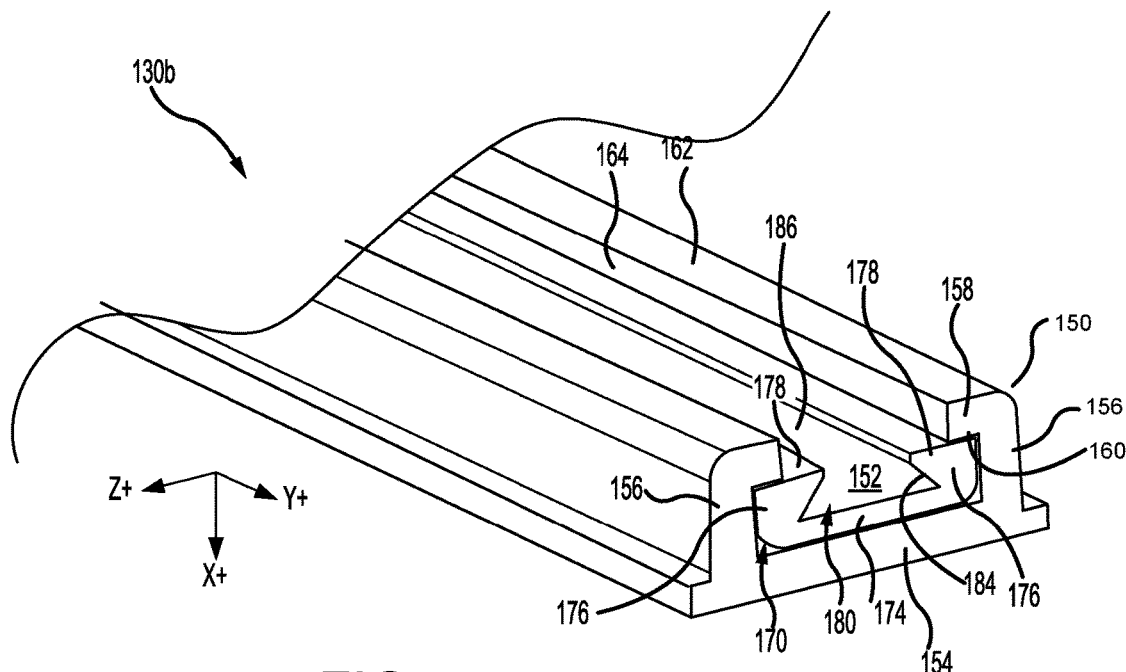
FIG. 5 illustrates a rail assembly having a dovetail insert channel, in accordance with various embodiments.
Figure 6:
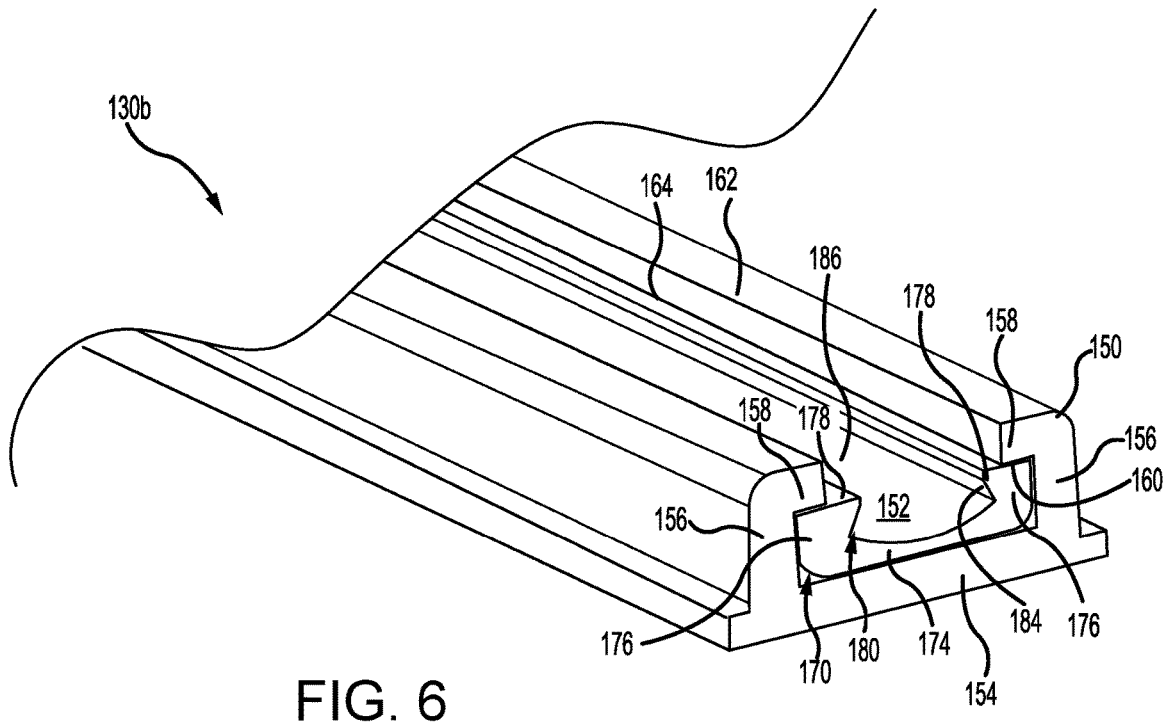
FIG. 6 illustrates a rail assembly having a curved insert channel, in accordance with various embodiments.

Referring now to FIG. 4, right rail assembly 130b is illustrated. While FIGS. 4, 5, and 6 show right rail assembly 130b, it is contemplated and understood that left rail assembly 130a is a mirror image of right rail assembly 130b. In accordance with various embodiments, right rail assembly 130b includes a rail 150 and an rail insert 152. In various embodiments, rail 150 may be a roller rail. In this regard, rail 150 may be compatible with ejection seats that employ rollers in place of sliders 120.

Rail 150 may include a base portion 154, a pair of opposing walls 156, and a pair of lips 158. With combined reference to FIG. 2 and FIG. 4, base portion 154 may extend vertically from a floor 144 of cockpit 18 (i.e., in the positive Y-direction). Walls 156 extend from base portion 154 toward seatback 102. Walls 156 are spaced apart from one another and are disposed substantially parallel to one another. As used in the previous context, "substantially parallel" means ±15° from parallel. Lips 158 extend from walls 156 and toward one another. Lips 158 each include a first surface 160, a second surface 162 opposite the first surface 160, and a connecting surface 164 extending between first surface 160 and second surface 162. First surface 160 is oriented toward base portion 154. Second surface 162 is oriented away from base portion 154 (i.e., toward seatback 102).

Rail 150 defines a channel 170. For example, base portion 154, walls 156, and first surface 160 of lips 158 define channel 170. Rail insert 152 is located within channel 170. Rail insert 152 extends vertically within channel 170 and along the length of rail 150. In various embodiments, rail insert 152 may have shape similar to rail 150. In this regard, rail insert 152 may include a base portion 174, a pair of opposing walls 176 extending from base portion 174, and a pair of lips 178 extending from walls 176 and toward one another. Rail insert 152 defines an insert channel 180. For example, an interior surface 182 of lips 178, an interior surface 184 of walls 176, and an interior surface 186 of base portion 174 define insert channel 180. Insert channel 180 is configured to receive sliders 120. In this regard, a cross-sectional shape of insert channel 180, as taken in a horizontal plane, may complement (i.e. coincide with and/or match) the cross-sectional shape of sliders 120, as taken in the horizontal plane. The horizontal plane being perpendicular to the Y-axis (i.e., the plane formed by the X and Z axes).

In various embodiments, rail insert 152 may be coupled to rail 150 via a friction coupling. For example, rail insert 152 may be press fit within rail 150. In various embodiments, rail insert 152 may be coupled to rail 150 via an adhesive. Rail insert 152 may also be coupled via, fasteners, screws, clips, or another suitable securement means.

During ejection, sliders 120 translate along rail inserts 152. Rail inserts 152 may be formed of any suitable material that reduces friction relative to sliders 120. For example, rail inserts 152 may be formed of steel, a low coefficient of friction plastic (e.g., polytetrafluoroethylene (PTFE), polyimide, polyether ether ketone (PEEK), etc.) or other suitably low coefficient of friction material. For example, in various embodiments, the material of rail inserts 172 is selected such the kinetic coefficient of friction for slider 120 on rail insert 172 is less than 0.75. In various embodiments, the kinetic coefficient of friction for slider 120 on rail insert 172 may be less than 0.50. In various embodiments, Forming rail inserts 152 using a low coefficient of friction material (e.g., steel, PTFE, polyimide, PEEK, etc.) tends to reduce binding between sliders 120 and the rail inserts 152.

In various embodiment, rail inserts 152 may be made of a first material (e.g., steel or a low coefficient of friction plastic) and rail 150 may be made of a second, different material (e.g., aluminum, titanium, or other structurally suitable material). In various embodiments, a friction reducing coating may be applied to interior surface 182 of lips 178, interior surface 184 of walls 176, and/or interior surface 186 of base portion 174. The friction reducing coating has a coefficient of sliding friction that is less than a coefficient of sliding friction of the interior surface of first rail insert (e.g., a coefficient of sliding friction that is less than a coefficient of sliding friction of interior surfaces 182, 184, and 186). The friction reducing coating may be a dry film lube or any other friction reducing coating. For example, the friction reducing coating may include titanium nitride, diamond like carbon (DLC), tungsten disulfide, or similar friction reducing coating.

In various embodiments, a friction reducing coating may be applied to one or more surface(s) of sliders 120 (e.g., the friction reducing coating may be applied to any surface of slider 120 that could come into contact with rail insert 152 or with rail 150. The friction reducing coating has a coefficient of sliding friction that is less than a coefficient of sliding friction of slider 120. The friction reducing coating may be a dry film lube or any other friction reducing coating. For example, the friction reducing coating may include titanium nitride, DLC, tungsten disulfide, or similar friction reducing coating.

With reference to FIG. 5, right rail assembly 130b is illustrated with insert channel 180 of rail insert 152 having a dovetail cross-sectional shape. In this regard, the interior surface 184 of each wall 176 may be oriented at an acute angle relative to interior surface 186 of base portion 174. For example, the interior surface 184 of each wall 176 may be oriented at an angle between 20° and 80°, between 30° and 70°, and/or at about 45° relative to interior surface 186 of base portion 174. The dovetail shape insert channel 180 may be employed with sliders 120 having a similar dovetail cross-sectional shape.

With reference to FIG. 6, right rail assembly 130b is illustrated with insert channel 180 of rail insert 152 having a concave floor. In this regard, the interior surface 188 of base portion 174 may form a concave curve between the interior surfaces 184 of walls 176. While the interior surfaces 184 of walls 176 are illustrated as oriented as non-parallel to one another in FIG. 6, in various embodiments, interior surfaces 184 may be substantially parallel to one another. As used in the previous context, "substantially parallel" means ±15° from parallel. The concave insert channel 180 may be employed with sliders 120 having a similar cross-sectional shape; for example, with sliders 120 having a convex curve that matches of the curve radius of interior surface 188. In various embodiments, sliders 120 having a planar, rather than curved, surface oriented toward interior surface 188 may be employed with curved insert channel 180. Locating a planar surfaced slider 120 in a curved insert channel 180, tends to reduce the area of surface contact between the slider 120 and the rail insert 152, which may decrease friction between the slider 120 and the rail insert 152.

Employing rail assemblies 130 having rail inserts 152 may allow rails 150 that were previously used with rollers to be retrofit for sliders 120. Thus, rails 150 may be employed with ejection seats having rollers and ejection seats having sliders. Rail inserts 152 tend to reduce friction and occurrences of binding between the rail assembly and the slider, which increases ejected height and overall ejection safety.

Figure 7:
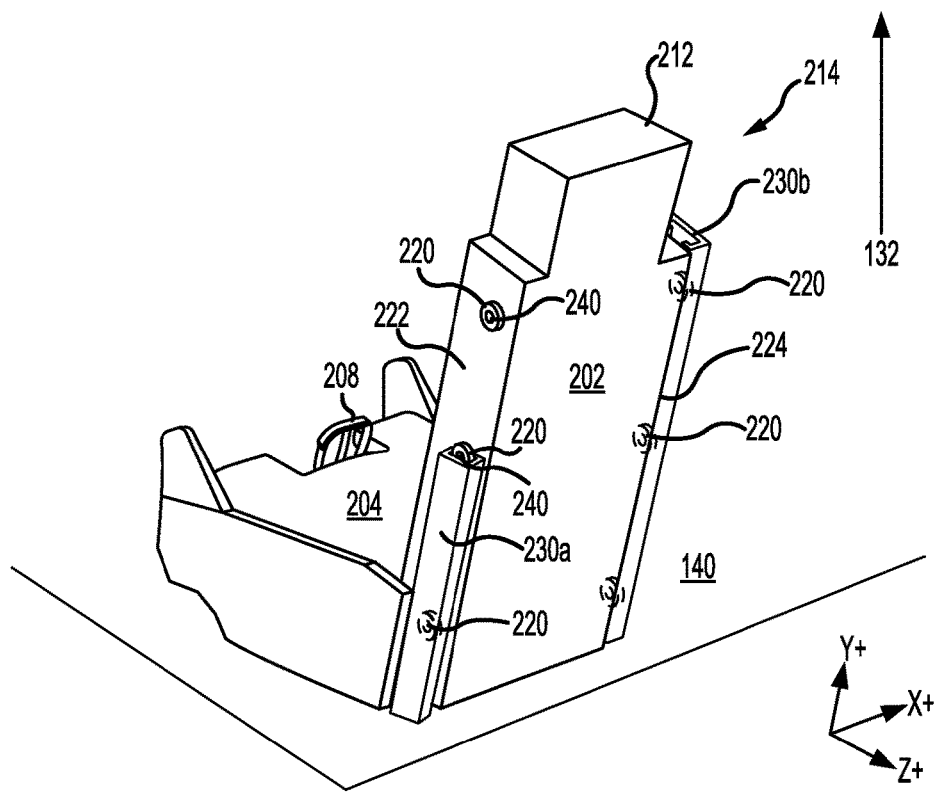
FIG. 7 illustrates an ejection seat and rail assembly, in accordance with various embodiments.

With reference to FIG. 7, an ejection seat 214 is illustrated. In various embodiments, ejection system 10, with momentary reference to FIG. 1, may include ejection seat 214 in place of, or in addition to, ejection seat 14. Ejection seat 214 includes a seatback 202, a seat pan 204, and an ejection handle 2, similar to ejection seat 14 in FIG. 2. In accordance with various embodiments, ejection seat 214 includes a plurality of rollers 220. Rollers 220 are coupled to opposing sides of ejection seat 214. For example, a plurality of first rollers 220 may be located along a left (or first) side 222 of seatback 202 and a plurality of second rollers 220 may be located along a right (or second) side 224 of seatback 202.

In accordance with various embodiments, a left (or first) rail 230a and a right (or second) rail 230b (collectively referred to as rails 230) are located proximate left side 222 and right side 224, respectively, of ejection seat 214. In FIG. 7, the upper portion of the left rail 230a has been removed to illustrate rollers 220. Rails 230 are configured to receive rollers 220. In this regard, the rollers 220 located along left side 222 may be located in left rail 230a and the rollers 220 located along right side 224 may be located in right rail 230b. Rails 230 are stationary structures which remain in cockpit 18 during expulsion of ejection seat 214. The coupling between rollers 220 and ejection seat 214 causes rollers 220 to translate with ejection seat 214 during ejection. During ejection, rollers 220 will translate within channels defined by their respective rail 230, while rotating (i.e., spinning) relative to seatback 202. In this regard, rollers 220 may be coupled to seatback 202 via a shaft 240. Rollers 220 are configured rotate about their respective shaft 240.

Rails 230 are configured to restrict rollers 220 from moving in the forward and aft directions (i.e., along the Z-axis) and/or in the left and right direction (i.e., along the X-axis), thereby helping to guide rollers 220 and ejection seat 214 out of cockpit 18 and in the direction of arrow 132 (i.e. in the positive direction on the Y-axis).

Figure 8:
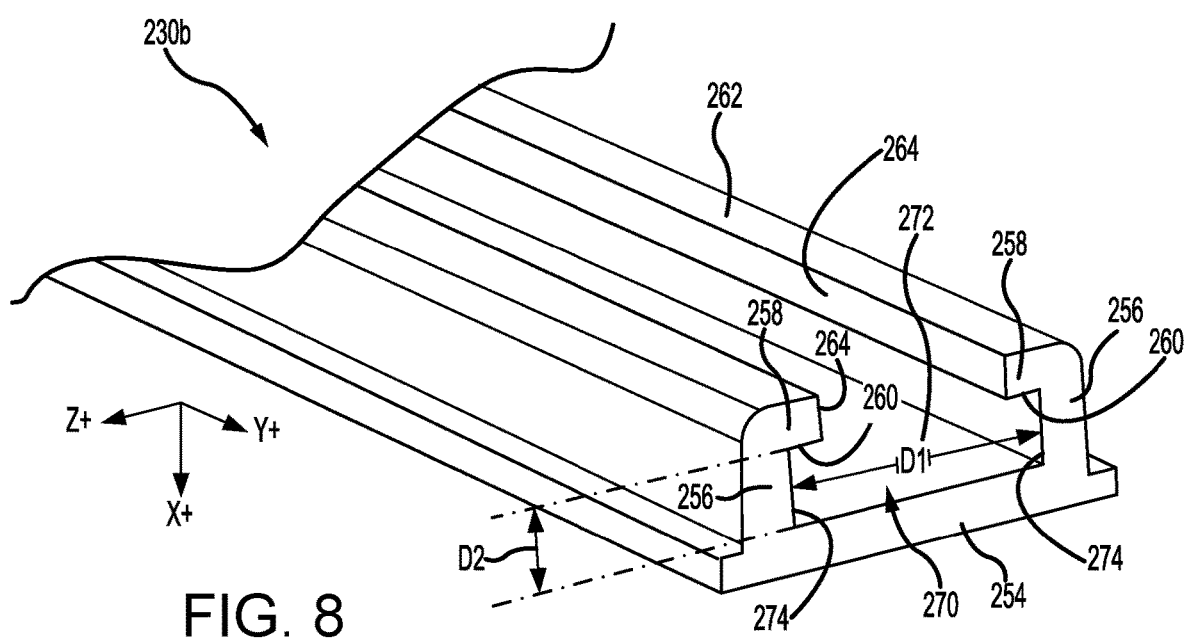
FIG. 8 illustrates a rail assembly, in accordance with various embodiments.

Referring now to FIG. 8, right rail 230b is illustrated. While FIG. 8 shows right rail 230b, it is contemplated and understood that left rail 230a is a mirror image of right rail 230b. In accordance with various embodiments, right rail 230b may include a base portion 254, a pair of opposing walls 256, and a pair of lips 258. With combined reference to FIG. 7 and FIG. 8, base portion 254 may extend vertically from floor 144 of cockpit 18 (i.e., in the positive Y-direction). Walls 256 extend from base portion 254 toward seatback 202. Walls 256 are spaced apart from one another and are disposed substantially parallel to one another. As used in the previous context, "substantially parallel" means ±15° from parallel. Lips 258 extend from walls 256 and toward one another. Lips 258 each include a first (or interior) surface 260, a second surface 262 opposite the first surface 260, and a connecting surface 264 extending between first surface 260 and second surface 262. First surface 260 is oriented toward base portion 254. Second surface 262 is oriented away from base portion 254 (i.e., toward seatback 202).

Right rail 230b defines a channel 270. For example, an interior surface 272 of base portion 254, interior surfaces 274 of walls 256, and first surface 260 of lips 258 define channel 270. Channel 270 is configured to receive rollers 220. In this regard, a distance D1 between interior surfaces 274 of walls 256 may be equal to, or slightly greater than, the diameter of roller 220, the diameter of roller 220 being measured at an outer circumference of the roller 220. As used in the previous context, "slightly greater than" means a difference of 0.5 inches (±1.3 cm) or less.

In various embodiments, a friction reducing coating may be applied to first surface 260 of lips 258, interior surface 274 of walls 256, and/or interior surface 272 of base portion 254. The friction reducing coating has a coefficient of sliding friction that is less than the coefficient of sliding friction of surface to which the coating is applied (e.g., a coefficient of sliding friction that is less than a coefficient of sliding friction of surfaces 260, 272, and 274). The friction reducing coating may be a dry film lube or any other friction reducing coating. For example, the friction reducing coating may include titanium nitride, DLC, tungsten disulfide, or similar friction reducing coating. The friction reducing coating tends to reduce occurrences of binding between rollers 220 and rails 230.

With combined reference to FIGS. 7 and 8, in various embodiments, a friction reducing coating may be applied to one or more surface(s) of rollers 220 (e.g., the friction reducing coating may be applied to any surface of roller 220 that could come into contact with rail 230. The friction reducing coating has a coefficient of sliding friction that is less than a coefficient of sliding friction of roller 220. The friction reducing coating may be a dry film lube or any other friction reducing coating. For example, the friction reducing coating may include titanium nitride, DLC, tungsten disulfide, or similar friction reducing coating.

Figure 9A:
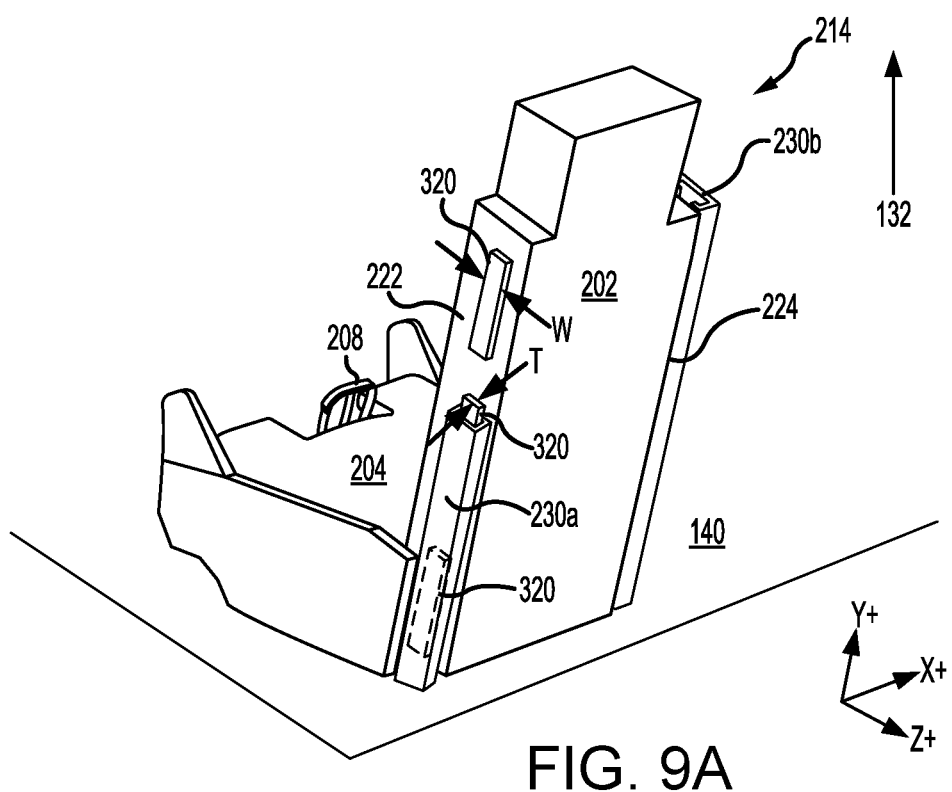
FIG. 9A illustrates an ejection seat and rail assembly, in accordance with various embodiments.
Figure 9B:
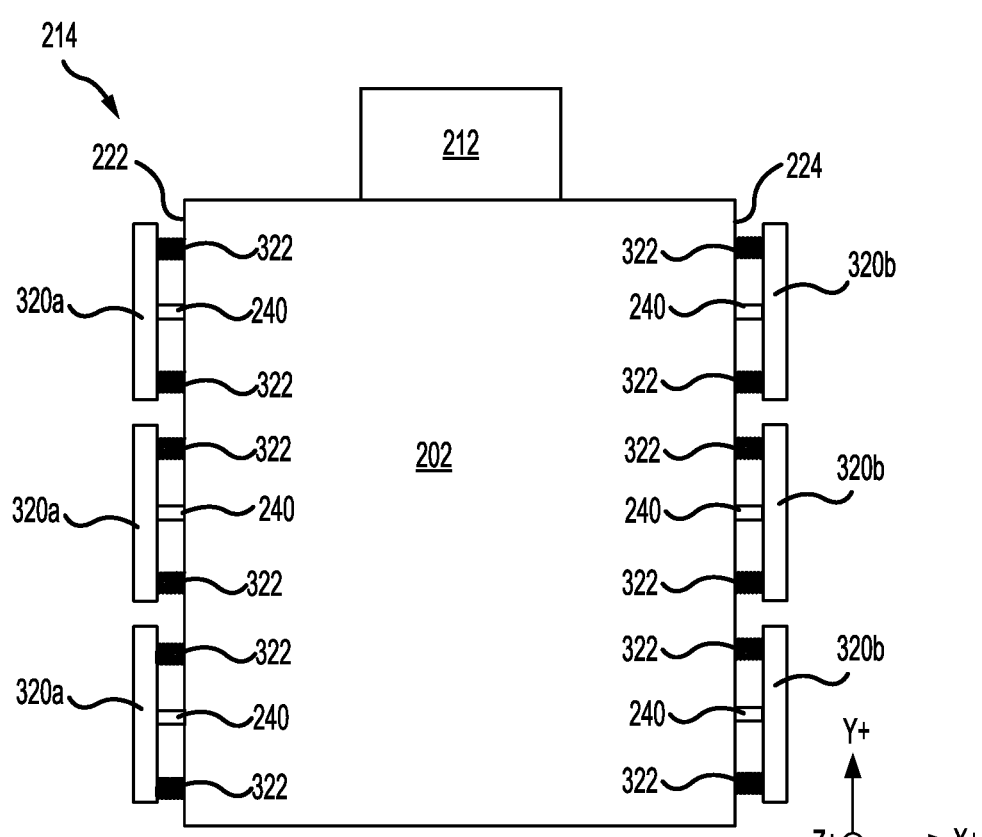
FIG. 9B illustrates an ejection seat, in accordance with various embodiments.

Referring now to FIG. 9A, ejection seat 214, including sliders 320, is illustrated, in accordance with various embodiments. In various embodiments, one or more of rollers 220, with momentary reference to FIG. 7, may be replaced with slider(s) 320. Sliders 320 are coupled to opposing sides of ejection seat 214. For example, and with reference to FIG. 9B, a plurality of first sliders 320a may be located along left side 222 of seatback 202 and a plurality of second sliders 320b may be located along right side 224 of seatback 202 (first sliders 320a and second sliders 320b collectively referred to as sliders 320). Each slider 320 may be coupled to seatback 202 via shaft 240. In various embodiments, ejection seat 214 may be retrofitted with sliders 320 by removing the rollers 220, with momentary reference to FIG. 7, from shafts 240 and attaching a slider 320 to shaft 240 in place of the removed roller 220. Shaft 240 allows seatback 202 to rotate, or pivot, relative to sliders 320. In this regard, shaft 240 allows seatback 202 to rotate in the fore and aft directions (i.e., about the X axis) relative to sliders 320 and rails 230.

In various embodiments, one or more damper(s) 322 may be attached between each first slider 320a and left side 222 of seatback 202, and between each second slider 320b and right side 224 of seatback 202. In various embodiments, a first damper 322 may be located proximate a first (or upper) end of each slider 320 and a second damper 322 may be located proximate a second (or lower) end of slider 320. The first end of each slider 320 being closer to a headrest 212 of ejection seat 214, as compared to the second end of the slider 320. Dampers 322 may include springs, wave washers, or any other suitable load damper. Dampers 322 are configured to dampen loads between ejection seat 214 and sliders 320. In this regard, dampers 322 may reduce vibration of ejection seat 214 during flight and ejection.

Returning to FIG. 9A, and with additional reference to FIG. 8, sliders 320 are configured to be located within the channels 270 of rails 230. The sliders 320 located along left side 222 of ejection seat 214 may be located in the channel 270 of left rail 230a and the sliders 320 located along right side 224 of ejection seat 214 may be located in the channel 270 of right rail 230b. In accordance with various embodiments, a cross-sectional shape of each slider 320, as taken in a horizontal plane, may complement (i.e. coincide with and/or match) the cross-sectional shape of channel 270, as taken in the horizontal plane, the horizontal plane being perpendicular to the Y-axis (i.e., the plane formed by the X and Z axes). For example, a width W of each slider 320 may be equal to, or slightly less than, the distance D1 between the interior surfaces 274 of walls 256 of rails 230; and the thickness T of each slider 320 may equal to, or slightly less than, the distance D2 between first surface 260 of lips 258 and interior surface 272 of base portion 254. As used in the previous context, "slightly less than" means a difference of 0.5 inches (±1.3 cm) or less.

As discussed above, rails 230 are stationary structures which remain in cockpit 18 during expulsion of ejection seat 214. The coupling between sliders 320 and ejection seat 214 causes sliders 320 to translate with ejection seat 214 during ejection. During ejection, sliders 320 will translate, or slide, within channels 270 of rails 230. The shape of sliders 320 along with the shape of rails 230 causes rails 230 to restrict sliders 320 from moving in the forward and aft directions (i.e., along the Z-axis) and/or in the left and right direction (i.e., along the X-axis), thereby helping to guide sliders 320 and ejection seat 214 out of cockpit 18 and in the direction of arrow 132 (i.e. in the positive direction on the Y-axis). Sliders 320 may be formed of any suitable material that will reduce friction between sliders 320 and rails 230. In various embodiments, sliders 320 may be formed of steel or other suitable low coefficient of friction material. For example, in various embodiments, the material of sliders 320 is selected such the kinetic coefficient of friction for slider 320 on rail 230 is less than 0.75. In various embodiments, the kinetic coefficient of friction for slider 320 on rail 230 may be less than 0.50. Forming sliders 320 using steel (or other low coefficient of friction material) tends to reduce friction and/or binding between sliders 320 and the rails 230.

As discussed above, in various embodiments, a friction reducing coating may applied to first surface 260 of lips 258, interior surface 274 of walls 256, and/or interior surface 272 of base portion 254 to further reduce friction between sliders 320 and rails 230. The friction reducing coating may be a dry film lube or any other friction reducing coating. For example, the friction reducing coating may include titanium nitride, DLC, tungsten disulfide, or similar friction reducing coating. The friction reducing coating tends to reduce occurrences of binding between sliders 320 and rails 230.

In various embodiments, a friction reducing coating may be applied to one or more surface(s) of sliders 320 (e.g., the friction reducing coating may be applied to any surface of slider 320 that could come into contact with rail 230). The friction reducing coating has a coefficient of sliding friction that is less than a coefficient of sliding friction of slider 320. The friction reducing coating may be a dry film lube or any other friction reducing coating. For example, the friction reducing coating may include titanium nitride, DLC, tungsten disulfide, or similar friction reducing coating.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An ejection system, comprising:
   an ejection seat;
   a plurality of first sliders coupled to the ejection seat, wherein the ejection seat is configured to rotate relative to a first slider of the plurality of first sliders; and
   a first rail assembly including:
      a first rail defining a first channel; and
      a first rail insert located in the first channel and defining a first insert channel,
   wherein the first insert channel is configured to receive the plurality of first sliders.

2. The ejection system of claim 1, wherein the first rail insert comprises:
   a base portion;
   a first wall extending from the base portion;
   a first lip extending from the first wall;
   a second wall extending from the base portion; and
   a second lip extending from the second wall and towards the first lip, wherein the first lip extends from the first wall towards the second lip.

3. The ejection system of claim 2, wherein the cross-sectional shape of the first insert channel is a dovetail.

4. The ejection system of claim 3, wherein a first interior surface of the first wall is oriented at an acute angle relative to an interior surface of the base portion, the first interior surface of the first wall and the interior surface of the base portion defining, at least, a portion of the first insert channel.

5. The ejection system of claim 4, wherein a cross-sectional shape of the first insert channel complements a cross-sectional shape of a first slider of the plurality of first sliders.

6. The ejection system of claim 2, wherein an interior surface of the base portion comprises a concave curve, the interior surface of the base portion defining, at least, a portion of the first insert channel.

7. The ejection system of claim 6, wherein a first interior surface of the first wall is parallel to a second interior surface of the second wall.

8. The ejection system of claim 1, further comprising a friction reducing coating formed over an interior surface of the first rail insert, the interior surface of the first rail insert defining, at least, a portion of the first insert channel, wherein the friction reducing coating has a coefficient of sliding friction that is less than a coefficient of sliding friction of the interior surface of the first rail insert.

9. The ejection system of claim 1, further comprising
   a plurality of second sliders coupled to the ejection seat, wherein the plurality of first sliders is located along a first side of the ejection seat and the plurality of second sliders is located along a second side of the ejection seat, the second side of the ejection seat being opposite the first side; and
   a second rail assembly located proximate the second side of the ejection seat, the second rail assembly including:
      a second rail defining a second channel; and
      a second rail insert located in the second channel and defining a second insert channel, wherein the second insert channel is configured to receive the plurality of second sliders.

10. The ejection system of claim 1, further comprising a damper coupled between the first slider and the ejection seat.

11. A rail assembly for guiding an ejection seat during ejection, the rail assembly comprising:
    a rail defining a channel;
    a rail insert located in the channel, the rail insert defining an insert channel; and
    a friction reducing coating formed over an interior surface of the rail insert, the interior surface of the rail insert defining, at least, a portion of the insert channel, wherein the friction reducing coating has a coefficient of sliding friction that is less than a coefficient of sliding friction of the interior surface of the rail insert.

12. The rail assembly of claim 11, wherein the rail insert is made of a first material and the rail is made of a second material different than the first material.

13. The rail assembly of claim 11, wherein the rail insert comprises:
    a base portion;
    a first wall extending from the base portion;
    a first lip extending from the first wall;
    a second wall extending from the base portion; and
    a second lip extending from the second wall and towards the first lip, wherein the first lip extends from the first wall towards the second lip.

14. The rail assembly of claim 13, wherein a first interior surface of the first wall is oriented at an acute angle relative to an interior surface of the base portion, the first interior surface of the first wall and the interior surface of the base portion defining, at least, a portion of the insert channel.

15. The rail assembly of claim 13, wherein an interior surface of the base portion comprises a concave curve, the interior surface of the base portion defining, at least, a portion of the insert channel.

16. An ejection system, comprising:
    an ejection seat including at least one of a plurality of sliders or a plurality of rollers coupled to a side of the ejection seat;
    a rail defining a channel configured to receive the at least one of the plurality of sliders or the plurality of rollers;
    a first friction reducing coating formed over an interior surface of the rail, the interior surface of the rail defining, at least, a portion of the channel, wherein the first friction reducing coating has a coefficient of sliding friction that is less than a coefficient of sliding friction of the interior surface of the rail; and
    a second friction reducing coating formed over the at least one of the plurality of sliders or the plurality of rollers, wherein the second friction reducing coating has a coefficient of sliding friction that is less than a coefficient of sliding friction of the at least one of the plurality of sliders or the plurality of rollers.

17. The ejection system of claim 16, wherein the ejection seat includes the plurality of sliders, and wherein the ejection seat further comprises:
- a first damper coupled between a first slider of the plurality of sliders and the side of the ejection seat; and
- a second damper coupled between the first slider and the side of the ejection seat, wherein a seatback of the ejection seat is configured to rotate relative to the first slider.

* * * * *